(12) United States Patent
Shankar et al.

(10) Patent No.: US 8,209,294 B2
(45) Date of Patent: Jun. 26, 2012

(54) DYNAMIC CREATION OF DATABASE PARTITIONS

(75) Inventors: Shrikanth Shankar, San Francisco, CA (US); Ananth Raghavan, San Francisco, CA (US); Badhri G. Varanasi, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

(21) Appl. No.: 11/764,121

(22) Filed: Jun. 15, 2007

(65) Prior Publication Data

US 2008/0313246 A1 Dec. 18, 2008

(51) Int. Cl.
*G06F 7/00* (2006.01)
(52) U.S. Cl. .......................... 707/665; 707/668; 707/802
(58) Field of Classification Search .................. 707/1, 2, 707/100, 102, 200, 205, 665, 667, 668, 802
See application file for complete search history.

(56) References Cited

U.S. PATENT DOCUMENTS

| | | | |
|---|---|---|---|
| 5,551,027 A | 8/1996 | Choy et al. | |
| 5,822,142 A | 10/1998 | Hicken | |
| 5,832,496 A | 11/1998 | Anand et al. | |
| 5,983,215 A | 11/1999 | Ross et al. | |
| 6,002,866 A * | 12/1999 | Fuller | 707/205 |
| 6,003,036 A * | 12/1999 | Martin | 707/102 |
| 6,341,289 B1 | 1/2002 | Burroughs et al. | |
| 6,405,198 B1 | 6/2002 | Bitar et al. | |
| 6,427,147 B1 | 7/2002 | Marquis | |
| 6,473,774 B1 | 10/2002 | Cellis et al. | |
| 6,484,179 B1 | 11/2002 | Roccaforte | |
| 6,609,131 B1 | 8/2003 | Zait et al. | |
| 6,711,563 B1 | 3/2004 | Koskas | |
| 6,820,095 B1 | 11/2004 | Yeung et al. | |
| 6,867,991 B1 | 3/2005 | Tezcan et al. | |
| 6,920,460 B1 | 7/2005 | Srinivasan et al. | |
| 6,931,390 B1 | 8/2005 | Zait et al. | |
| 7,143,091 B2 * | 11/2006 | Charnock et al. | 1/1 |
| 7,143,105 B2 * | 11/2006 | Nakano et al. | 707/102 |
| 7,146,377 B2 | 12/2006 | Nowicki et al. | |
| 7,158,996 B2 | 1/2007 | Croisettier et al. | |
| 7,334,002 B2 | 2/2008 | Byrne | |
| 7,356,549 B1 * | 4/2008 | Bruso et al. | 707/696 |
| 7,395,402 B2 | 7/2008 | Wilson et al. | |
| 7,406,499 B2 | 7/2008 | Singh et al. | |
| 7,447,839 B2 | 11/2008 | Uppala | |

(Continued)

OTHER PUBLICATIONS

Oracle Corporation, Oracle8 Concepts Release 8.0 A58227-01, 9 Partitioned Tables and Indexes, http://download-east.oracle.com/docs/cd/A58617_01/server.804/a58227/ch_pti.htm#436962, printed Sep. 26, 2007, pp. 1-31.

(Continued)

*Primary Examiner* — Pierre Vital
*Assistant Examiner* — Christopher J Raab
(74) *Attorney, Agent, or Firm* — Hickman Palermo Truong Becker Bingham Wong LLP; Karl T. Rees (57) ABSTRACT

A method and apparatus for managing data in a partitioned data storage space is provided. Data referencing a new data item to be stored in the data storage space is received. It is determined that the data item does not pertain to any previously created partition. In response to the determination, a new partition is automatically created in the data storage space. The partition is mapped to a new set of values, such as to a next unpartitioned interval of dates or numbers.

54 Claims, 7 Drawing Sheets

U.S. PATENT DOCUMENTS

| | | | |
|---|---|---|---|
| 7,457,832 B2 | 11/2008 | Baird et al. | |
| 7,458,066 B2 | 11/2008 | Rhine | |
| 7,483,981 B2 | 1/2009 | Weinert et al. | |
| 7,617,370 B2 | 11/2009 | Jernigan et al. | |
| 7,676,514 B2 | 3/2010 | Faibish et al. | |
| 7,698,334 B2 | 4/2010 | Kazar et al. | |
| 7,716,420 B2 | 5/2010 | Gole et al. | |
| 7,716,448 B2 | 5/2010 | Schneider | |
| 7,774,329 B1 | 8/2010 | Peddy et al. | |
| 7,890,541 B2* | 2/2011 | Teng et al. | 707/802 |
| 7,949,865 B1 | 5/2011 | Yadav | |
| 2002/0087510 A1 | 7/2002 | Weinberg et al. | |
| 2002/0194157 A1 | 12/2002 | Zait et al. | |
| 2002/0194196 A1 | 12/2002 | Weinberg et al. | |
| 2003/0061263 A1 | 3/2003 | Riddle | |
| 2003/0149702 A1 | 8/2003 | Saffer et al. | |
| 2004/0260671 A1* | 12/2004 | Potter et al. | 707/1 |
| 2004/0267782 A1* | 12/2004 | Nakano et al. | 707/100 |
| 2005/0187897 A1 | 8/2005 | Pawar et al. | |
| 2006/0004886 A1 | 1/2006 | Green et al. | |
| 2006/0206507 A1 | 9/2006 | Dahbour | |
| 2006/0253431 A1 | 11/2006 | Bobick et al. | |
| 2007/0239793 A1 | 10/2007 | Tyrrell et al. | |
| 2007/0260842 A1 | 11/2007 | Faibish et al. | |
| 2008/0091690 A1* | 4/2008 | Ellersick et al. | 707/100 |
| 2008/0104359 A1 | 5/2008 | Sauer et al. | |
| 2008/0114749 A1* | 5/2008 | Chandhok et al. | 707/5 |
| 2008/0140937 A1 | 6/2008 | Nalawade et al. | |
| 2008/0228829 A1* | 9/2008 | Crutchfield et al. | 707/200 |
| 2008/0256029 A1* | 10/2008 | Abrink | 707/2 |

OTHER PUBLICATIONS

Oracle Corporation, Oracle® Database Concepts 10g Release 1 (10.1) Part No. B10743-01, 18 Partitioned Tables and Indexes, http://download-east.oracle.com/docs/cd/B14117_01/server.101/b10743/partconc.htm, printed Sep. 26, 2007, pp. 1-16.

Oracle Corporation, Oracle® Database Administrator's Guide 10g Release 1 (10.1) Part No. B10739-01, 16 Managing Partitioned Tables and Indexes, http://download-east.oracle.com/docs/cd/B14117_01/server.101/b10739/partiti.htm, printed Sep. 26, 2007, pp. 1-62.

U.S. Appl. No. 11/764,126, filed Jun. 15, 2007, Final Office Action, Mailing Date Mar. 16, 2011.

Shahzad, Muhammad A., "Data Warehousing with Oracle", Proc. Of SPIE, vol. 3695, Orlando, FL, Apr. 5, 1999, pp. 179-190.

Farazdel, Abbas et al., "Oracle8i Parallel Server on IBM SP systems: Implementation Guide", IBM Redbooks, SG24-5591-00, Dec. 1999, pp. cover, i-ii, 56-60, 119-120 and 122.

Leverenz et al., "Oracle8 Server Concepts", Jun. 1997, Release 8.0, pp. 8-1 to 8-40.

U.S. Appl. No. 11/764,131, filed Jun. 15, 2007, Office Action, Mailing Date Jul. 11, 2011.

* cited by examiner

DYNAMIC CREATION OF DATABASE PARTITIONS

FIELD OF THE INVENTION

The present invention relates generally to data storage and, more particularly, to the partitioning of data storage spaces.

BACKGROUND

Data stored on a computer system is typically arranged into one or more data storage spaces. Collectively, these data storage spaces are often referred to as a database. Each data storage space comprises one or more data items. Data items in a particular space share common characteristics. A data item may have a value for each of these characteristics. For example, relational databases store data in a number of spaces known as tables. The data items in each table, forming the "rows" of the table, share the same "columns" of data, in that for each column of data, any item in the table may have a value.

It is helpful to partition data storage spaces for administrative purposes such as archiving, caching, enhancing performance, copying or deleting data, and free space management. For example, spaces that store data items with date characteristics are often partitioned so that each partition comprises only those items that pertain to a particular range of dates. One partition, for example, might only store data items pertaining to a particular month. Another partition might only store data items that pertain to a particular fiscal quarter. Since a partition also comprises data items that share common characteristics, a partition may also be considered a data storage space.

The determination of to which, if any, partition a data item pertains is made by looking up one or more of the data item's values in a partition mapping. The partition mapping maps certain sets or ranges of values to certain partitions. These sets or ranges of values correspond to one or more characteristics shared by the data items in the partitioned storage space. These characteristics are known as partitioning characteristics. For tables, these sets or ranges of values may correspond to the value of a particular column upon which the partition mapping is said to be based. This column is known as the partitioning column. For example, a partition mapping for a table might be based upon the value of a data item's date column. The mapping could define ranges of dates, such as months or years. Each range could pertain to a separate partition. To determine the partition to which a new data item pertains, one would determine under which of the defined ranges the value of the item's date column fell. Partition mappings may be based on multiple partitioning characteristics, which is often the case with subpartitions. Partition mappings may also be based on a variety of other characteristics, such as whether a data item pertains to a particular range of numbers or set of discrete values.

Spaces may also comprise "catch-all" partitions, which contain data items that do not pertain to any other partition found within the space. Since existing mechanisms for partitioning spaces require that each partition be created manually, a catch-all partition is helpful when it is necessary to store a data item whose values were not contemplated in the partitioning scheme. For example, if a space consisted of partitions for each week of 2007, but a data item pertaining to 2008 were received, the data item would be stored in the catch-all partition. While catch-all partitions are useful fail-safe mechanisms, they are typically no more helpful for administrative purposes than unpartitioned spaces.

Existing methods for partitioning data storage spaces rely on mechanisms external to the database system to create new partitions when necessary. One such mechanism is for a database administrator to manually create new partitions immediately before they are required. This mechanism is problematic in that it requires that the administrator know when new partitions will be required—knowledge which may not always be available to the administrator. The mechanism is also inefficient in that the administrator must either remember to create a new partition each time a new partition is required or deploy a utility (or script) to periodically create the partition for the administrator. Deploying and troubleshooting such a utility incurs additional time and monetary costs for the administrator.

Alternatively, an administrator may simply create all the partitions that he or she anticipates will be needed long before they are ever needed. Again, this is problematic in that it requires the administrator to know what partitions will be necessary. It is also inefficient in that it wastes resources with empty partitions that may not be used for a very long time.

A simpler and more efficient mechanism for partitioning tables is desirable in order to facilitate the more widespread use of partitioned spaces.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for the automatic creation of new partitions inside a data storage space. According to one embodiment of the invention, a values-to-partition mapping is maintained for a data storage space. The mapping identifies sets of mapped values, wherein each set pertains to a previously created partition. Data, such as an SQL statement, is received, referencing a data item to be newly stored in the space. If it is determined, by comparing values within the data item to the mapped values, that the data item does not pertain to a previously created partition, a new partition is automatically created to store the data item. The values-to-partition mapping is updated to include a new set of mapped values that pertain to the new partition. The new set of mapped values may be determined in a variety of ways, such as using a user-specified formula.

According to one embodiment of the invention, a user specifies, through a configuration mechanism such as a configuration file or administrative interface, intervals at which a database system should create new partitions. The intervals may be based on ranges of values, such as dates or numbers. Data, such as an SQL statement, is received, referencing a data item to be newly stored in the space. If it is determined that the data item pertains to a new interval—that is, an interval for which no item pertaining to that interval has previously been received—a new partition is automatically created to store the data item.

According to one embodiment of the invention, a user specifies, through a configuration mechanism such as a configuration file or administrative interface, time-based intervals at which a database system should create new partitions. The database system monitors a time indicator that indicates the current time. When the time indicator indicates a current time pertaining to a new interval—that is, an interval that is different from the interval pertaining to the last observed value of the time indicator—a new partition is automatically created to store data items pertaining to the new interval.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The techniques described below are transparent to the end user. New partitions are created automatically when they are required, without requiring a database administrator to manually create partitions or deploy external utilities to periodically create the partitions. According to one embodiment of the invention, the techniques described are implemented internal to the database system in which the data storage space resides.

Exemplary Data Storage Space

Figure 1A:
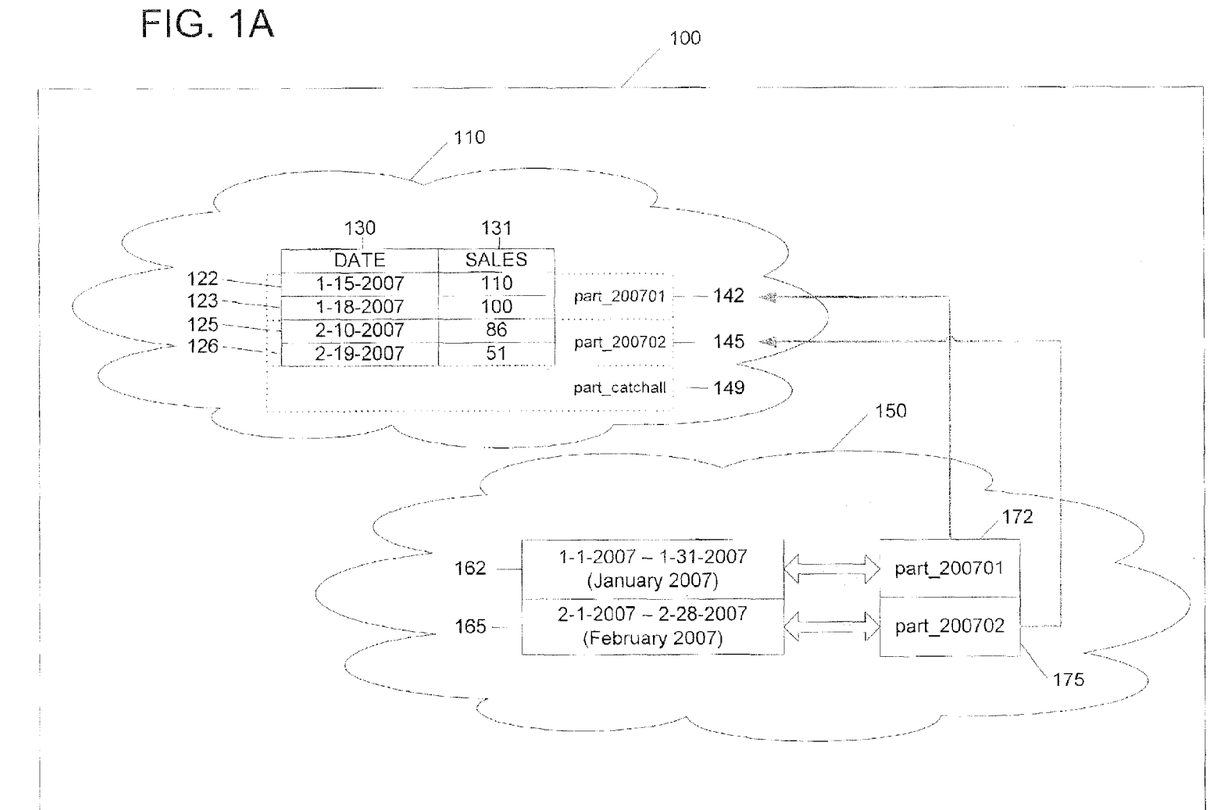
FIG. 1A depicts an exemplary partitioned space in accordance with the prior art.

FIG. 1A depicts an exemplary partitioned space in accordance with the prior art. Storage space 110 is a relational table in database system 100, and may also be referred to as table 110. Table 110 contains data items 122, 123, 125, and 126. Each of data items 122, 123, 125, and 126 contains values for columns 130 and 131. Column 130 is an indexed column and contains date-based values. Column 131 contains integer values.

Table 110 is divided into partitions 142, 145, and 149. Partition mapping 150 is a values-to-partition mapping that comprises sets of mapped values 162 and 165 associated with partition addresses 172 and 175. Set of mapped values 162 describes a range of date values, namely "January 2007," and pertains to the partition identified by partition address 172, namely partition 142. Set of mapped values 165 describes a range of date values, namely "February 2007," and pertains to the partition identified by partition address 175, namely partition 145. According to one embodiment, partition mapping 150 may be stored as a separate table inside of database system 100. For example, partition mapping 150 may be a global table for system metadata or partition lookups.

Partition 142 comprises data items 122 and 123, which were assigned to partition 142 because their values for indexed column 130 (which serves as the partitioning column) belonged to set of mapped values 162 (January 2007). Partition 145 comprises data items 125 and 126, which were assigned to partition 145 because their values for indexed column 130 belonged to set of mapped values 165 (February 2007). Partition 149, which is empty, is a "catch-all" partition.

Figure 1B:
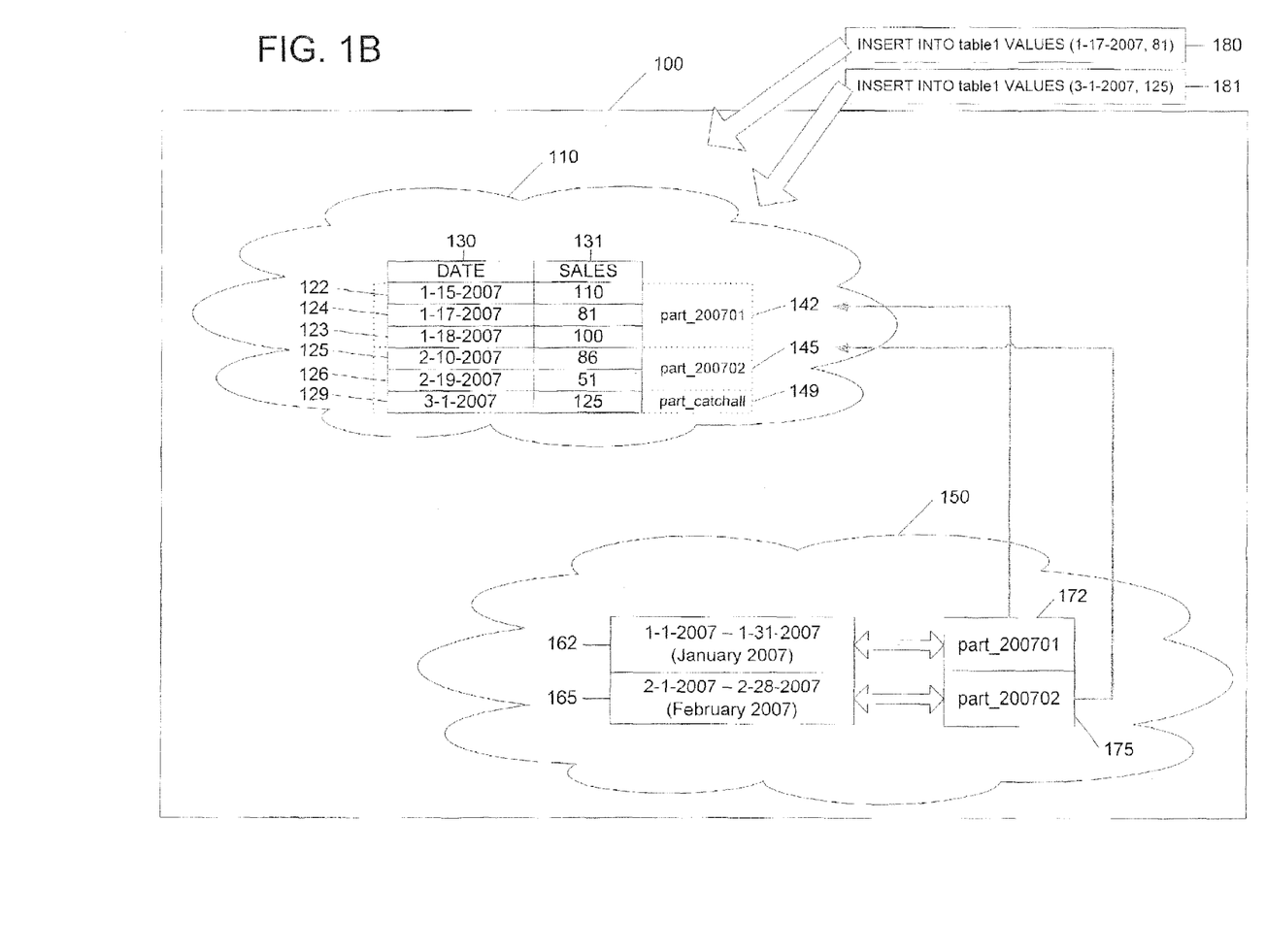
FIG. 1B depicts the effect of inserting several data items into the exemplary partitioned space of FIG. 1A in accordance with the prior art.

FIG. 1B depicts the effect of inserting several data items into the exemplary partitioned space of FIG. 1A in accordance with the prior art. It contains all of the features of FIG. 1A, plus two new data items, data items 124 and 129, which were added as a result of database system 100 receiving and processing SQL statements 180 and 181. These statements reference data items 124 and 129, respectively.

In accordance with the prior art, data item 124 has been stored in partition 142. It was assigned to partition 142 because the value for its indexed column, "1-17-07," was determined to belong to set of mapped values 162, which includes all values ranging from "1-01-07" to "1-31-07." According to partition mapping 150, set of mapped values 162 pertains to partition address 172, which points to partition 142.

Data item 129 has been stored in the catch-all partition 149. It was assigned to the catch-all partition 149 because the value for its indexed column, "3-1-07," was not described in partition mapping 150.

Figure 1C:
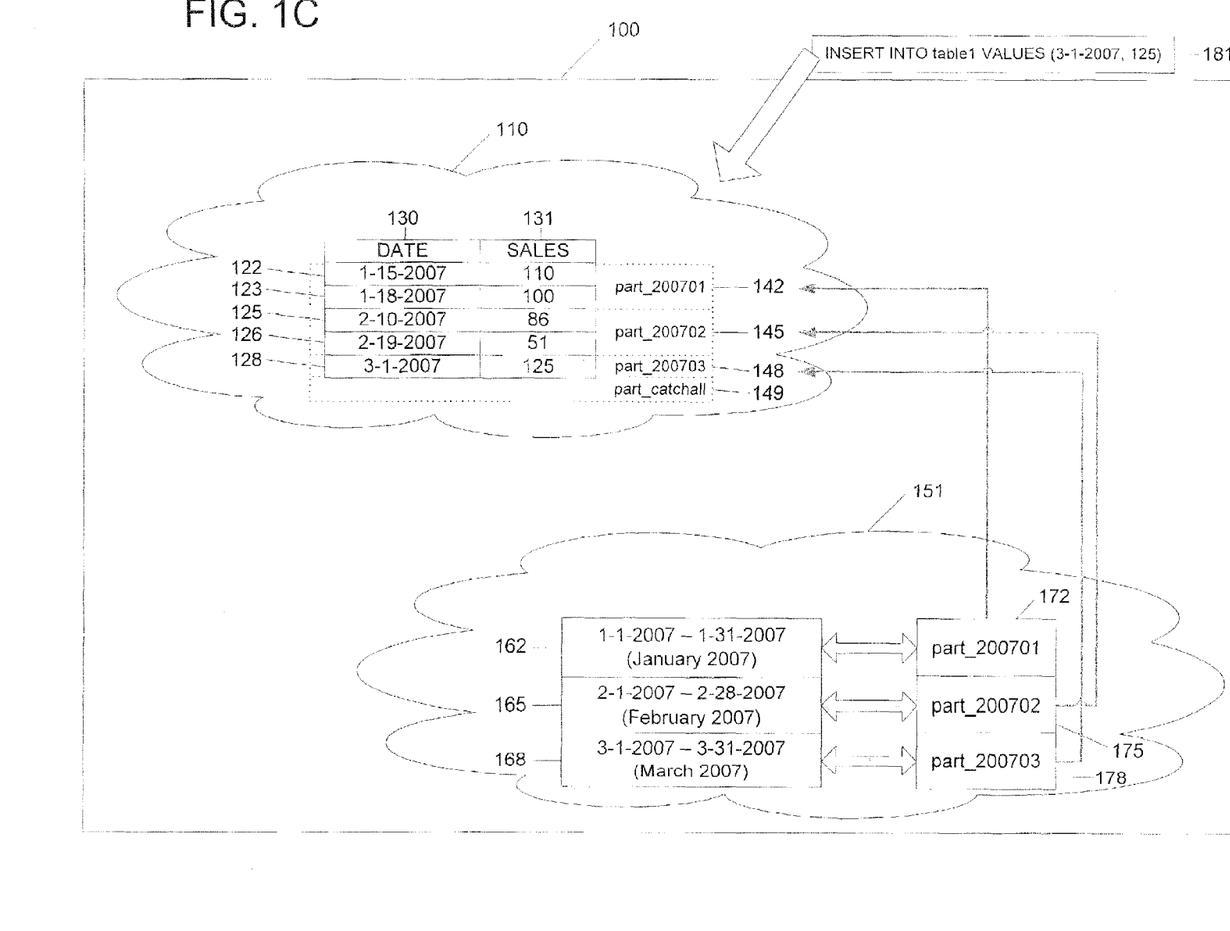
FIG. 1C depicts the effect of inserting several data items into the exemplary partitioned space of FIG. 1A in accordance with an embodiment of the invention.

FIG. 1C depicts the effect of inserting several data items into the exemplary partitioned space of FIG. 1A in accordance with an embodiment of the invention. It contains many of the features of FIG. 1A. Additionally, it includes several new or updated features: data item 128, partition 148, partition mapping 151, set of mapped values 168, and partition address 178. These features were added or updated in response to database system 100 receiving and processing SQL statement 181, which is one of the same statements processed in FIG. 1B.

Although data item 128 is identical to data item 129 from FIG. 1B, data item 128 has been stored in the new partition 148. Again, it was determined that the value for its indexed column, "3-1-07," was not described in partition mapping 150. However, rather than place data item 128 in catch-all partition 149, a new partition 148 was automatically created by database system 100 to store data item 128. Also, a new set of mapped values 168 was created, pertaining to a new partition address 178, which in turn points to the new partition 148. The new set of mapped values 168 and partition address 178 were added to partition mapping 150 to form the updated partition mapping 151.

Note that new set of mapped values 168, covering a range of date values in "March 2007," includes "3-1-07," which is the value of data item 128's indexed column 130. Mechanisms for choosing a new set of mapped values 168 will be discussed shortly. Also note that catch-all partition 149 is still included in FIG. 1C, and may still be used to store outlying data items for which the creation of a new partition would be inefficient.

As will be appreciated by one skilled in the art, the described techniques may be implemented in any database table 110, regardless of the data stored or the number of columns. For example, the sets of mapped values in partition mapping 150 may comprise ranges of numbers or sets of discrete values. The sets of mapped values in partition mapping 150 may also comprise sets of multiple values pertaining to multiple partitioning columns in table 110, so as to describe subpartitions. Furthermore, the described techniques may be implemented for storage spaces 110 other than tables and for database systems 100 that are not relational.

Process Flow for Responding to Non-Mapped Values Insertion

Figure 2:
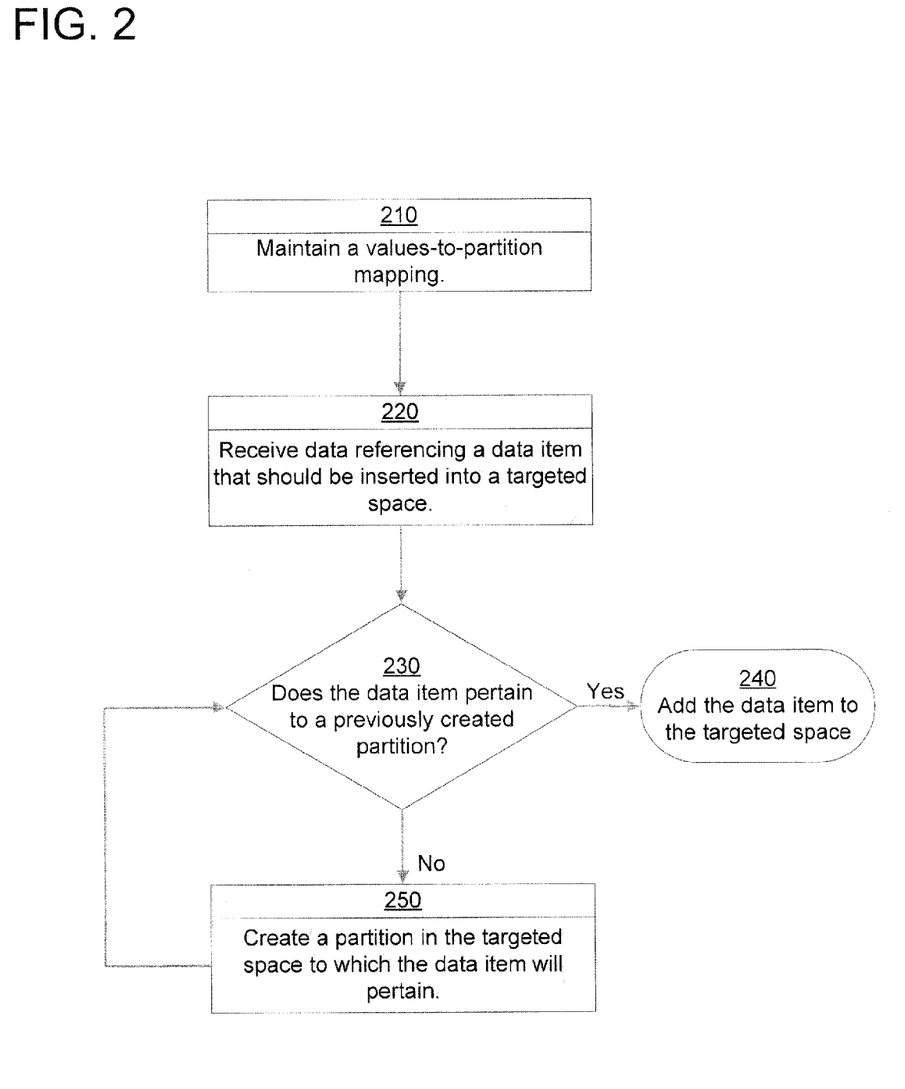
FIG. 2 is a flowchart illustrating the operation of an embodiment of the invention wherein new partitions are created in response to the insertion of data items that do not pertain to previously created partitions.

FIG. 2 is a flowchart illustrating the operation of an embodiment of the invention wherein new partitions are created in a data storage space inside of a database system in response to the insertion of data items that do not pertain to previously created partitions. The data storage space may be any space used to store data in a database, such as a table or even a partition of a table.

In step 210, a values-to-partition mapping, such as partition mapping 150 of FIG. 1, is maintained. The values-to-partition mapping comprises sets of mapped values. The sets of mapped values may be, for example, ranges of dates or numbers, or non-continuous sets of discrete values. Each set of mapped values is mapped to a partition inside of the data storage space. The values-to-partition mapping may be maintained inside the database system as a global table of system metadata or partition look-up information. It may also be maintained in other forms, both internal and external to the database system.

In step 220, data, such as an SQL statement, is received. The data references a data item that should be inserted into the data storage space. For example, the data could be an INSERT statement targeting the data storage space.

In step 230, a determination is made concerning whether or not the data item pertains to a previously created partition. The values-to-partition mapping may be used to determine to which, if any, partition the data item pertains. Such a determination is made by comparing one or more values inside of the data item to the sets of mapped values.

According to one embodiment, the values-to-partition mapping also indicates a partitioning characteristic. According to one embodiment, the partitioning characteristic is a primary indexing characteristic. For example, if the data storage space is indexed upon a characteristic named 'STORE_NUMBER,' one could determine the partition to which a data item pertained by determining under which of the sets of mapped values the value of the item's 'STORE_NUMBER' characteristic fell, and then identifying the partition to which the determined set of mapped values is mapped. Characteristics other than indexed characteristics may also serve as partitioning characteristics. Other mechanisms for determining a partition to which a data item pertains based on a values-to-partition mapping are well-known within the art and may also be used.

If it is determined that the data item pertains to a previously created partition, then the flow proceeds to step 240, which is to add the data item to the data storage space in the partition to which the data item pertains. At this point, the flow ends.

Otherwise, the flow continues to step 250, in which a new partition is created in the data storage space. As part of this step, the values-to-partition mapping is updated to reflect the new partition. Accordingly, a new set of mapped values is added to the values-to-partition mapping, and the new set of mapped values is mapped to the new partition. The new set is chosen so as to ensure that the data item will be determined to pertain to the new partition. Mechanisms for choosing an appropriate new set of values will be disclosed shortly.

Upon creation of the new partition, the flow returns to step 230. Since the new set of mapped values has been appropriately chosen, the data item will be determined to pertain to a previously created partition. Thus, the data item will be added to the new partition in step 240.

Mechanisms for Determining New Sets of Mapped Values

In one embodiment of the invention, as part of the process of creating a new partition to store a new item, a mapping from a set of values to the new partition is created. This set of values—in other words the new set of mapped values—is chosen so as to comprise the one or more values from the new item used to determine to which partition the new item pertains. For example, if the new item is being stored in a table whose partitioning column comprises date values, and the new item's value for that column is '2-12-07,' an appropriate set of values could be, for example, any one of the following: the range of dates from '2-11-07' to '2-18-07,' the range of dates encompassing February 2007, or the range of dates encompassing the year 2007. In one embodiment of the invention, the new set of mapped values is also chosen so as to avoid overlap with any previously existing set of mapped values, so that no item can be mapped to multiple partitions.

There are many mechanisms known within the art for choosing a new set of mapped values that achieve the results stated above. One such mechanism produces sets that are based on ranges of values. The upper and lower bounds of the set are functions of the one or more values from the new item used to determine to which partition the new item pertains. There are many functions capable of achieving the results above. For example, if the partitioning scheme is based upon the value of a column of numbers, the functions $L=N*(x \mod N)$ and $U=N*((x \mod N)+1)$ would produce suitable results, where x is the value of the new item's partitioning column and N is the desired size of each partition. The set would be all values greater than or equal to L, but lower than U. As one skilled in the art will appreciate, many variations of these functions could be employed. For example, one variation would be to tweak the functions so as to take into account irregular values of N, such as when it is desirable to produce partitions for months or years.

Another such mechanism would be to base new sets on a hash function. In this case, the new set of mapped values would be the set of all mapped values that hash to the same partition. Yet another such mechanism could be to maintain a separate list of sets of values indicating which values (or ranges of values) should be partitioned together. The set under which the new item's value falls could then simply be copied to the partition mapping as the new set of mapped values.

According to one embodiment, a user may specify the mechanism to be used through a configuration file or administrative interface. Alternatively, the user may specify a set of parameters, such as an interval size or frequency, and the database system may formulate a mechanism based on the specified parameters.

According to one embodiment, the partition mapping for the space could also employ one of the mechanisms described above, or a logical variation thereof, to determine the partition to which a new item pertains. For example, if a hash function is employed to determine a new set of mapped values, that very same hash function could be used to determine the partition to which any item pertains. As another example, the partition mapping might use the function $p=x \mod N$ to determine the partition to which a new item pertains, where p is the partition number, x is the value of the new item's partitioning column, and N is the desired size of each partition.

Process Flow for Interval Partitioning

Figure 3:
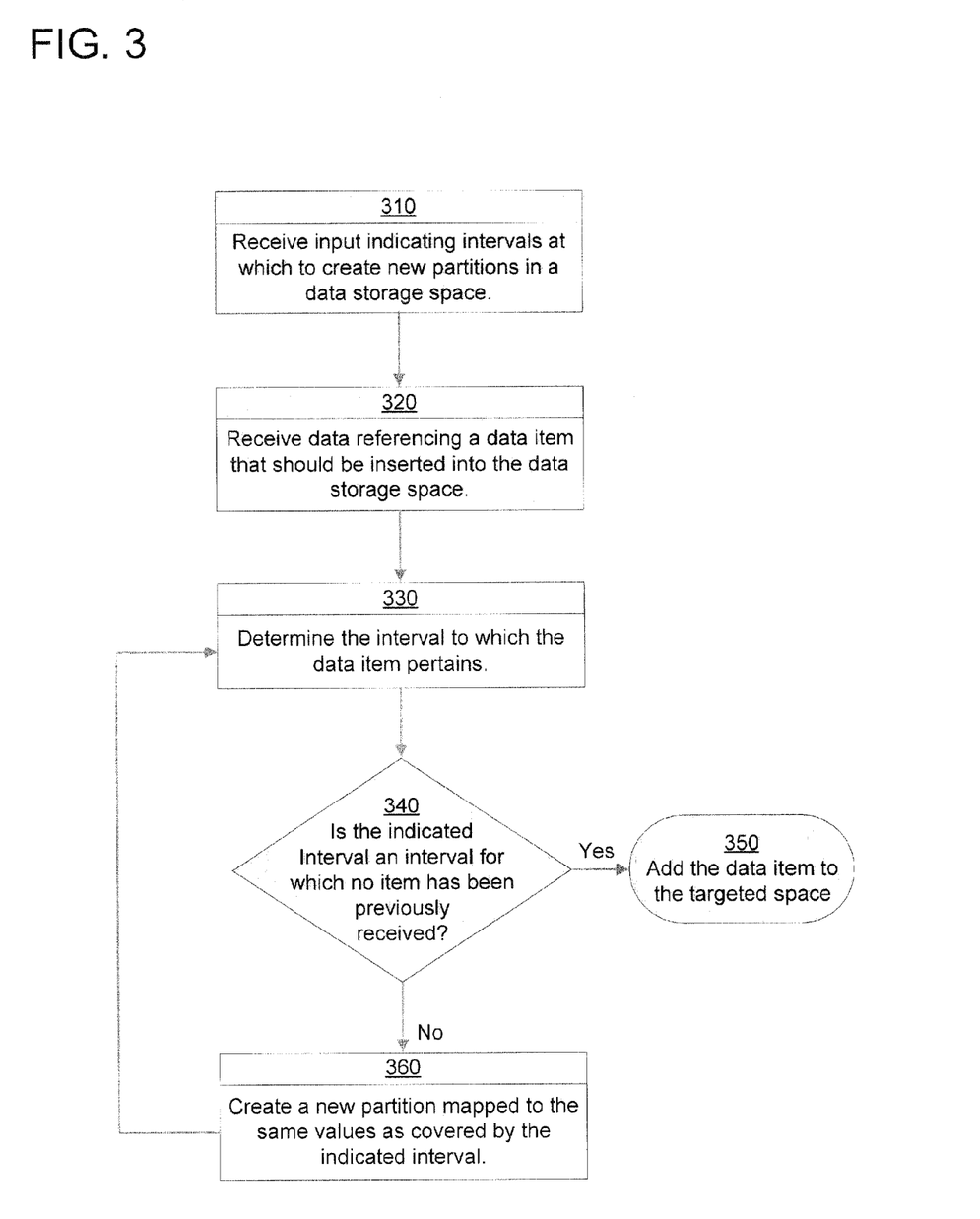
FIG. 3 is a flowchart illustrating the operation of an embodiment of the invention wherein new partitions are created in response to the insertion of data items pertaining to a previously unencountered user-specified interval.

FIG. 3 is a flowchart illustrating the operation of an embodiment of the invention wherein new partitions are created in a database table in response to the insertion of data items pertaining to a previously unencountered user-specified interval.

In step 310, input is received indicating intervals at which to create new partitions. The intervals are ranges of values for the partitioning column. The input may be received using a variety of interfaces known within the art. For example, the interface may be a configuration file stored on a server. The interface may also be a graphical or console-based administrative interface. The interface may present a variety of ways to select intervals. For example, if the partitioning column stores dates, the interface might present options to select intervals based on standard time intervals such as minutes, days, weeks, months, quarters, and years. If the partitioning scheme is based upon the value of a column that stores numbers, the interface might present options to select intervals based on specified numeric increments. The intervals need not be of equal size. For example, the interface might facilitate intervals whose sizes are described by mathematical formulas.

In step 320, data, such as an SQL statement, is received. The data references a data item that should be inserted into the data storage space. For example, the data could be an INSERT statement targeting the database table.

In step 330, a determination is made concerning to which interval the data item pertains. This determination is made by determining under which interval the item's value for the partitioning column falls. For example, if the intervals are based on months, and the item has a value of '2-11-07' in its partitioning column, the item will be determined to pertain to the February 2007 interval.

In step 340, a determination is made concerning whether or not the interval indicated in step 330 is an interval for which an item pertaining to that interval has previously been received. One mechanism for making such a determination is to lookup the interval in data that has been maintained indicating for which intervals items have previously been received. Another mechanism could be to determine whether a partition corresponding to ranges of values covered by the interval has previously been created. Other mechanisms known within the art may also be used.

If it is determined that items have previously been received for the indicated interval, the flow proceeds to step 350, in which the data item is added to the table. Otherwise, the flow proceeds to step 360, in which a new partition is created. The new partition should be mapped to the same values that are covered by the indicated interval. Once the partition has been created, the flow returns to step 350, and the data item is added to the table in the new partition.

Process Flow for Time-Triggered Interval Partitioning

Figure 4:
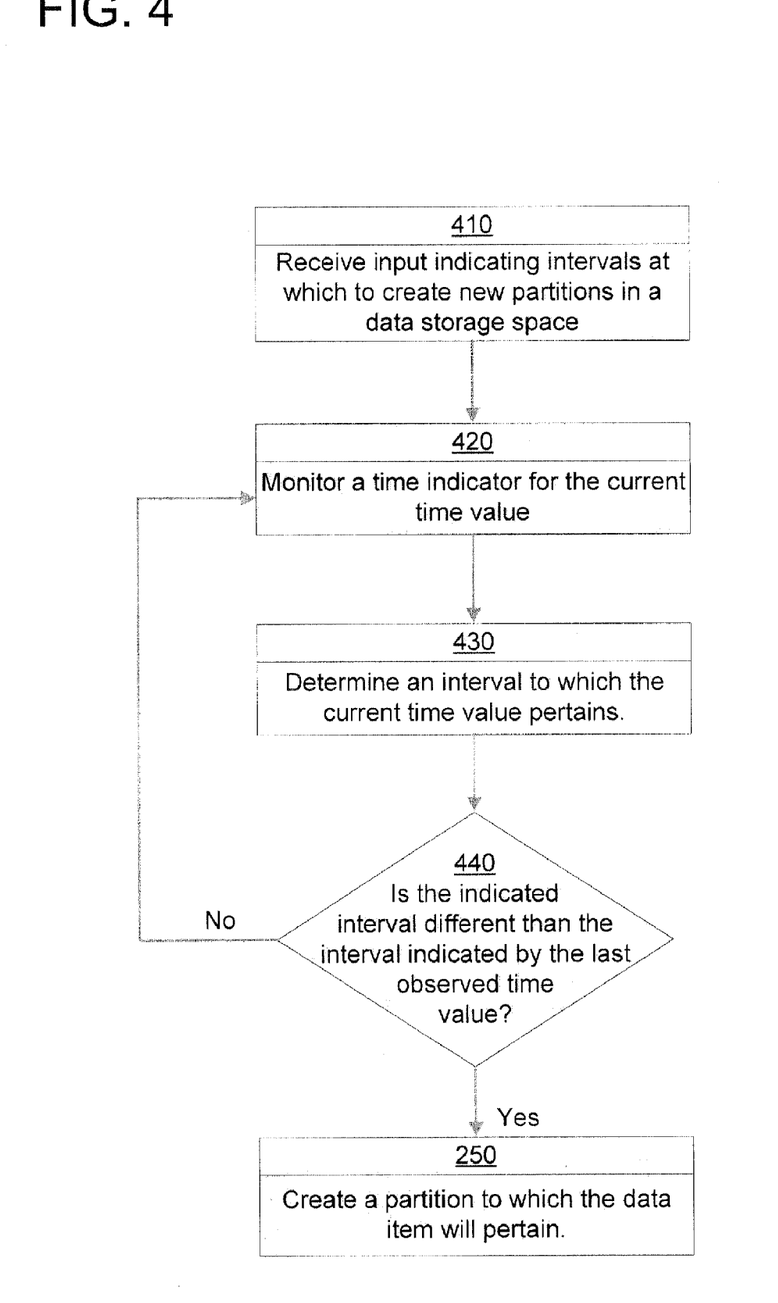
FIG. 4 is a flowchart illustrating the operation of an embodiment of the invention wherein new partitions are created in response to the lapsing of user-specified time intervals.

FIG. 4 is a flowchart illustrating the operation of an embodiment of the invention wherein new partitions are created in a data storage space in response to the lapsing of user-specified time intervals.

In step 410, input is received indicating intervals at which to create new partitions. The intervals are ranges of time values. The input may be received using a variety of interfaces known within the art. For example, the interface may be a configuration file stored on a server. The interface may also be a graphical or console-based administrative interface. The interface may present a variety of ways to select intervals. For example, the interface might present options to select intervals based on standard time intervals such as minutes, days, weeks, months, quarters, and years. The intervals need not be of equal size. For example, the interface might facilitate intervals whose sizes are described by mathematical formulas.

In step 420, a time indicator is monitored. The time indicator indicates a current time value. For example, the time indicator may be an internal clock on a computer.

In step 430, a determination is made concerning to which interval the current time value, as indicated by the time indicator, pertains. For example, if the intervals are based on months, and the current date is '2-11-07,' the current time value will be determined to pertain to the February 2007 interval.

In step 440, the interval indicated in step 430 is determined to be different than the interval indicated by the previously observed time value. This could happen, for example, if the intervals are year-based, and the time indicator indicates that a new year has begun since the last time the time indicator was checked.

In step 450, a new partition is created. The new partition should be mapped to the same values that are covered by the indicated interval.

Hardware Overview

Figure 5:
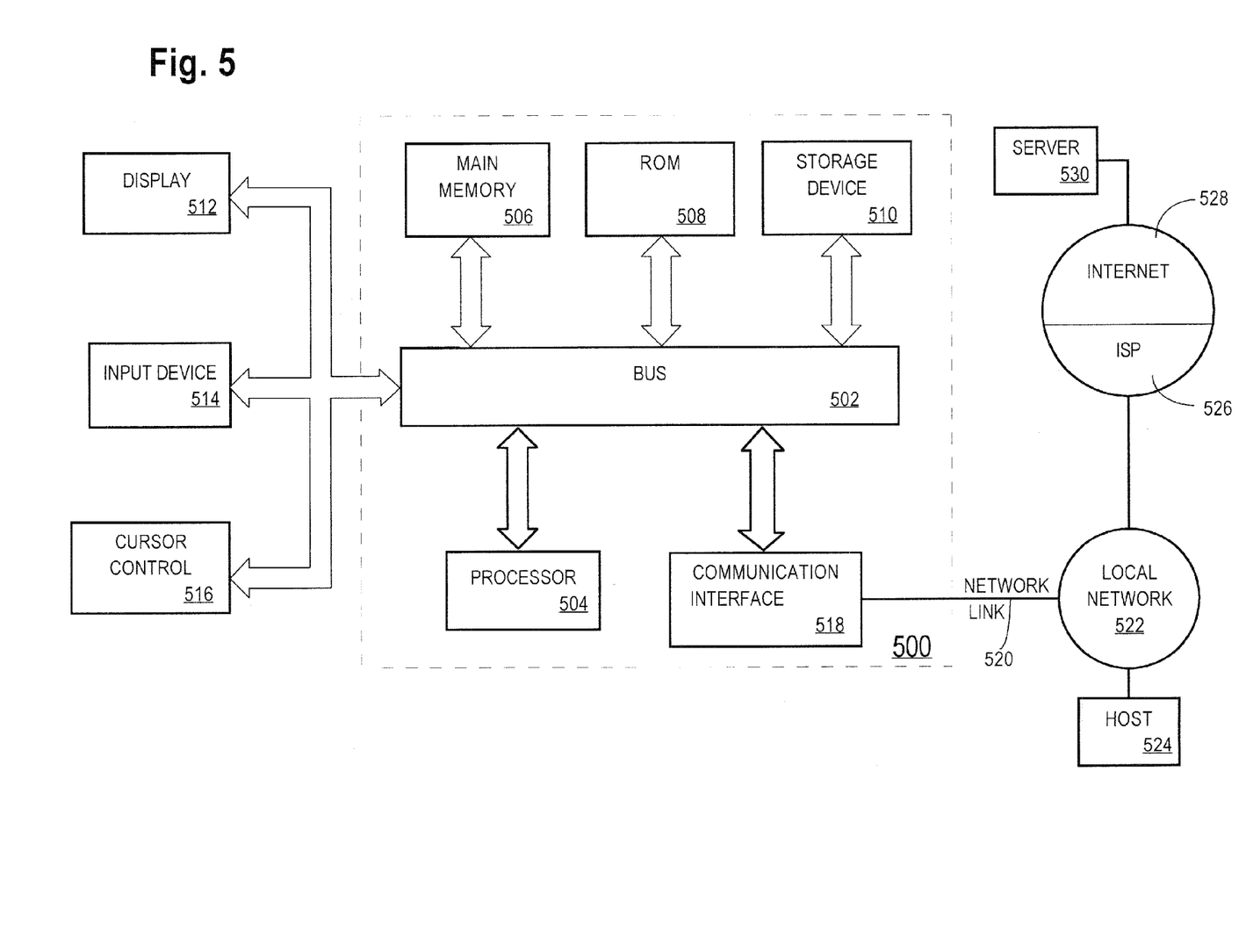
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
  maintaining a values-to-partition mapping for a partitioned space;
    wherein the values-to-partition mapping indicates sets of one or more mapped values, each of said sets being mapped to an existing partition in the partitioned space;
  receiving a request to store a first item in the partitioned space;
  in response to the request:
    based on the values-to-partition mapping for the partitioned space, determining that the first item should be placed in a particular partition that has not yet been created in the partitioned space;
    wherein determining that the first item should be placed in the particular partition that has not yet been created in the partitioned space comprises determining that the first item comprises a first value that does not belong to any of the sets of one or more mapped values;
    in response to said determining, creating the particular partition in the partitioned space; and
    storing the first item in the particular partition;
  updating the values-to-partition mapping to indicate that a first set of one or more values is mapped to the newly created particular partition, wherein the first set of one or more values comprises the first value;

wherein the first set of one or more values is determined at least partially based on at least one of: a hash function of the first value, or a range of continuous values described by a formula;

wherein the method is performed by one or more computing devices.

2. The method of claim 1 wherein the request is an SQL statement.

3. The method of claim 1 wherein:

for each item in the partitioned space in which a particular column of data contains a value found in the sets of one or more mapped values, the values-to-partition mapping indicates a partition in which the item is stored;

the values-to-partition mapping indicates in which partition a given item is stored at least in part by indicating in which of the sets of one or more mapped values the value of the item's particular column of data is found; and the first value is found in the first item's particular column of data.

4. The method of claim 1 wherein the first set of one or more values is determined at least partially based on the hash function dependent upon the first value.

5. The method of claim 1 wherein the first set of one or more values is determined at least partially based on the range of continuous values described by the formula.

6. The method of claim 5 the formula describes ranges of discrete continuous values, including said range, whose sizes are at least one of: of equal size, or based on at least one of the following periods of time: years, quarters, months, and weeks.

7. The method of claim 1 wherein the partitioned space is one of: a database table or a partition within a database table.

8. A method, comprising:

maintaining a values-to-partition mapping for a partitioned table;

wherein the values-to-partition mapping indicates sets of one or more mapped values, each of said sets being mapped to an existing partition in the partitioned table;

maintaining data defining a partitioning scheme for a table, wherein the partitioning scheme indicates intervals of values in a partitioning column at which to create new partitions in the table;

receiving a request to store an item in the table;

based on a first value in the partitioning column for the item, determining that the item belongs to a particular interval;

in response to the request:

based at least partially on a formula indicated by the partitioning scheme, determining that the particular interval corresponds to a first set of one or more values for which no partition has yet been created;

in response to said determining, creating a particular partition in the table for the first set of one or more values corresponding to the particular interval; and storing the item in the particular partition;

updating the values-to-partition mapping to indicate that the first set of one or more values is mapped to the newly created particular partition, wherein the first set of one or more values comprises the first value;

wherein the method is performed by one or more computing devices.

9. The method of claim 8 wherein the intervals are increments of values in a partitioning column of the table.

10. The method of claim 9 wherein the increments are of equal size.

11. The method of claim 9 wherein the increments are based upon a period of time.

12. One or more computer-readable storage media, storing instructions that, when executed by one or more computing devices, causes:

maintaining a values-to-partition mapping for a partitioned space;

wherein the values-to-partition mapping indicates sets of one or more mapped values, each of said sets being mapped to an existing partition in the partitioned space;

receiving a request to store a first item in the partitioned space;

in response to the request:

based on the values-to-partition mapping for the partitioned space, determining that the first item should be placed in a particular partition that has not yet been created in the partitioned space;

wherein determining that the first item should be placed in the particular partition that has not yet been created in the partitioned space comprises determining that the first item comprises a first value that does not belong to any of the sets of one or more mapped values;

in response to said determining, creating the particular partition in the partitioned space; and storing the first item in the particular partition;

updating the values-to-partition mapping to indicate that a first set of one or more values is mapped to the newly created particular partition, wherein the first set of one or more values comprises the first value;

wherein the first set of one or more values is determined at least partially based on at least one of: a hash function of the first value, or a range of continuous values described by a formula.

13. The one or more computer-readable storage media of claim 12 wherein the request is an SQL statement.

14. The one or more computer-readable storage media of claim 12 wherein:

for each item in the partitioned space in which a particular column of data contains a value found in the sets of one or more mapped values, the values-to-partition mapping indicates a partition in which the item is stored;

the values-to-partition mapping indicates in which partition given item is stored at least in part by indicating in which of the sets of one or more mapped values the value of the item's particular column of data is found; and the first value is found in the first item's particular column of data.

15. The one or more computer-readable storage media of claim 12 wherein the first set of one or more values is determined at least partially based on the hash function dependent upon the first value.

16. The one or more computer-readable storage media of claim 12 wherein the first set of one or more values is determined at least partially based on the range of continuous values described by the formula.

17. The one or more computer-readable storage media of claim 16 the formula describes ranges of continuous discrete values, including said range, whose sizes are at least one of: of equal size, or based on at least one of the following periods of time: years, quarters, months, and weeks.

18. The one or more computer-readable storage media of claim 12 wherein the partitioned space is one of: a database table or a partition within a database table.

19. One or more computer-readable storage media, storing instructions that, when executed by one or more computing devices, causes:
   maintaining a values-to-partition mapping for a partitioned table;
   wherein the values-to-partition mapping indicates sets of one or more mapped values, each of said sets being mapped to an existing partition in the partitioned table;
   maintaining data defining a partitioning scheme for a table, wherein the partitioning scheme indicates intervals of values in a partitioning column at which to create new partitions in the table;
   receiving a request to store an item in the table;
   based on a first value in the partitioning column for the item, determining that the item belongs to a particular interval;
   in response to the request:
      based at least partially on a formula indicated by the partitioning scheme, determining that the particular interval corresponds to a first set of one or more values for which no partition has yet been created;
      in response to said determining, creating a particular partition in the table for the first set of one or more values corresponding to the particular interval; and
      storing the item in the particular partition;
      updating the values-to-partition mapping to indicate that the first set of one or more values is mapped to the newly created particular partition, wherein the first set of one or more values comprises the first value.

20. The one or more computer-readable storage media of claim 19 wherein the intervals are increments of values in a partitioning column of the table.

21. The one or more computer-readable storage media of claim 20 wherein the increments are of equal size.

22. The one or more computer-readable storage media of claim 20 wherein the increments are based upon a period of time.

23. The method of claim 1, wherein the values-to-partition mapping is described by a global table of system metadata or partition look-up information.

24. The method of claim 4, wherein the values-to-partition mapping comprises the hash function.

25. The method of claim 4, further comprising determining the hash function for the partitioned space based on one or more parameters specified via user input in a configuration file or administrative interface.

26. The method of claim 5, wherein the values-to-partition mapping comprises the formula.

27. The method of claim 5, further comprising determining the formula for the partitioned space based on one or more parameters specified via user input in a configuration file or administrative interface.

28. The method of claim 1, wherein values-to-partition mapping maps each partition to distinct sets of tuples of values across multiple partitioning columns.

29. The method of claim 8, wherein the values-to-partition mapping is described by a global table of system metadata or partition look-up information.

30. The method of claim 8, wherein the values-to-partition mapping comprises the formula.

31. The method of claim 9, further comprising:
   receiving, via a configuration file or administrative interface, user input specifying said increments;
   determining the intervals and the formula based on the increments.

32. The method of claim 8, where values-to-partition mapping maps each partition to distinct sets of tuples of values across multiple portioning columns.

33. The one or more computer-readable storage media of claim 12, wherein the values-to-partition mapping is described by a global table of system metadata or partition look-up information.

34. The one or more computer-readable storage media of claim 15, wherein the values-to-partition mapping comprises the hash function.

35. The one or more computer-readable storage media of claim 15, wherein the instructions, when executed by the one or more computing devices, further cause determining the hash function for the partitioned space based on one or more parameters specified via user input in a configuration file or administrative interface.

36. The one or more computer-readable storage media of claim 16, wherein the values-to-partition mapping comprises the formula.

37. The one or more computer-readable storage media of claim 16, wherein the instructions, when executed by the one or more computing devices, further cause determining the formula for the partitioned space based on one or more parameters specified via user input in a configuration file or administrative interface.

38. The one or more computer-readable storage media of claim 12, wherein values-to-partition mapping maps each partition to distinct sets of tuples of values across multiple partitioning columns.

39. The one or more computer-readable storage media of claim 19, wherein the values-to-partition mapping is described by a global table of system metadata or partition look-up information.

40. The one or more computer-readable storage media of claim 19, wherein the values-to-partition mapping comprises the formula.

41. The one or more computer-readable storage media of claim 20, wherein the instructions, when executed by the one or more computing devices, further cause:
   receiving, via a configuration file or administrative interface, user input specifying said increments;
   determining the intervals and the formula based on the increments.

42. The one or more computer-readable storage media of claim 19, wherein values-to-partition mapping maps each partition to distinct sets of tuples of values across multiple partitioning columns.

43. A method, comprising:
   receiving input indicating a partition size for a partitioned space;
   maintaining data describing mappings between existing partitions in the partitioned space and value ranges for partitioning keys;
   receiving a request to store a first item in the partitioned space;
   in response to the request:
      identifying a partitioning key value for the first item;
      based on the mappings, determining that the partitioning key value is not within any of the value ranges that are mapped to existing partitions;
      in response to the determining, creating a new partition in the partitioned space; and
      storing the first item in the new partition;
      updating the data describing the mappings to indicate that a new value range is mapped to the new partition, wherein the partitioning key value for the first item is within the new value range;

wherein the new value range is a range of continuous discreet values having upper bounds and lower bounds that are determined at least partially based on one or more functions of the partition size wherein the method is performed by one or more computing devices.

44. The method of claim 43, wherein the partition size is one of the following periods of time: years, quarters, months, and weeks.

45. The method of claim 43, wherein a particular one of the one or more functions of the partition size involves at least determining a maximum value for the new value range based on adding the partition size to one of: the highest value mapped to an existing partition in the mappings, or the highest multiple of the partition size that is less than the partitioning key value.

46. The method of claim 43, wherein the input indicating the partition size indicates a plurality of partition sizes for the partitioned space, including the partition size, along with criteria for identifying which of the plurality of partition sizes to use when creating new partitions.

47. The method of claim 43, wherein at the time of the request, the data describing the mappings includes data indicating the new value range, wherein updating the data describing the mappings comprises associating the new partition with the new value range.

48. The method of claim 43, wherein updating the data describing the mappings comprises adding a new row to a partition lookup table, the new row comprising minimum and maximum values for the new value range, stored in association with data identifying the new partition.

49. One or more computer-readable storage media, storing instructions that, when executed by one or more computing devices, causes:
receiving input indicating a partition size for a partitioned space;
maintaining data describing mappings between existing partitions in the partitioned space and value ranges for partitioning keys;
receiving a request to store a first item in the partitioned space;
in response to the request:
identifying a partitioning key value for the first item;
based on the mappings, determining that the partitioning key value is not within any of the value ranges that are mapped to existing partitions;
in response to the determining, creating a new partition in the partitioned space; and
storing the first item in the new partition;
updating the data describing the mappings to indicate that a new value range is mapped to the new partition, wherein the partitioning key value for the first item is within the new value range;
wherein the new value range is a range of continuous discreet values having upper bounds and lower bounds that are determined at least partially based on one or more functions of the partition size
wherein the method is performed by one or more computing devices.

50. The one or more computer-readable storage media of claim 49, wherein the partition size is one of the following periods of time: years, quarters, months, and weeks.

51. The one or more computer-readable storage media of claim 49, wherein a particular one of the one or more functions of the partition size involves at least determining a maximum value for the new value range based on adding the partition size to one of: the highest value mapped to an existing partition in the mappings, or the highest multiple of the partition size that is less than the partitioning key value.

52. The one or more computer-readable storage media of claim 49, wherein the input indicating the partition size indicates a plurality of partition sizes for the partitioned space, including the partition size, along with criteria for identifying which of the plurality of partition sizes to use when creating new partitions.

53. The one or more computer-readable storage media of claim 49, wherein at the time of the request, the data describing the mappings includes data indicating the new value range, wherein updating the data described the mappings comprises associating the new partition with the new value range.

54. The one or more computer-readable storage media of claim 49, wherein updating the data describing the mappings comprises adding a new row to a partition lookup table, the new row comprising minimum and maximum values for the new value range, stored in association with data identifying the new partition.

* * * * *

UNITED STATES PATENT AND TRADEMARK OFFICE
CERTIFICATE OF CORRECTION

PATENT NO. : 8,209,294 B2
APPLICATION NO. : 11/764121
DATED : June 26, 2012
INVENTOR(S) : Shankar et al.

Page 1 of 1

It is certified that error appears in the above-identified patent and that said Letters Patent is hereby corrected as shown below:

On the Title Page:

In Page 2, Item (56), Under OTHER PUBLICATIONS insert -- U.S. Appl. No. 11/764,131, filed Jun 15, 2007, Office Action, Mailing Date Nov. 15, 2011 --.

In Page 2, Item (56), Under OTHER PUBLICATIONS insert -- U.S. Appl. No. 11/764,126, filed Jun 15, 2007, Office Action, Mailing Date Nov. 23, 2011 --.

In column 11, line 30, in Claim 6, delete "discrete continuous" and insert -- continuous discrete --, therefor.

In column 12, line 47, in Claim 14, before "given" insert -- a --.

In column 14, line 1, in Claim 32, delete "where" and insert -- wherein --, therefor.

In column 14, line 3, in Claim 32, delete "portioning" and insert -- partitioning --, therefor.

In column 16, line 35, in Claim 53, delete "described" and insert -- describing --, therefor.

In column 16, line 39, in Claim 54, delete "49," and insert -- 51, --, therefor.

Signed and Sealed this
Twenty-fifth Day of September, 2012

David J. Kappos
*Director of the United States Patent and Trademark Office*